US008775350B1

(12) United States Patent
Hall et al.

(10) Patent No.: US 8,775,350 B1
(45) Date of Patent: Jul. 8, 2014

(54) METHOD FOR SORTING A DEFINED SET OF COMMENTS

(76) Inventors: Gene Hall, Mountain View, CA (US);
Lee J. Parnell, Georgetown, TX (US);
Mahalingeshwara Saravu, Milpitas, CA (US)

( * ) Notice: Subject to any disclaimer, the term of this patent is extended or adjusted under 35 U.S.C. 154(b) by 237 days.

(21) Appl. No.: 13/474,952

(22) Filed: May 18, 2012

Related U.S. Application Data

(60) Provisional application No. 61/592,426, filed on Jan. 30, 2012.

(51) Int. Cl.
*G06F 17/00* (2006.01)
*G06F 17/27* (2006.01)
(52) U.S. Cl.
USPC .................................................. 706/46; 704/9

(58) Field of Classification Search
CPC .......... G06F 17/30522; G06F 17/3053; G06F 17/30554; G06F 17/30643
USPC ........................................... 704/9; 706/45–61
See application file for complete search history.

(56) References Cited

U.S. PATENT DOCUMENTS

| 5,265,065 | A | * | 11/1993 | Turtle ................................. 1/1 |
| 6,363,373 | B1 | * | 3/2002 | Steinkraus ........................... 1/1 |
| 8,346,701 | B2 | * | 1/2013 | Wang et al. ..................... 706/46 |
| 2010/0063797 | A1 | * | 3/2010 | Cong et al. ........................ 704/9 |
| 2012/0330946 | A1 | * | 12/2012 | Arredondo et al. ........... 707/728 |

* cited by examiner

*Primary Examiner* — Samuel G Neway
(74) *Attorney, Agent, or Firm* — Plager Schack, LLP

(57) ABSTRACT

This is directed to systems, processes, machines, and other means that allow a user to effectively sort comments. The invention is a method that enables a user to combine similar uses of words to determine which comments are most meaningful.

13 Claims, 1 Drawing Sheet

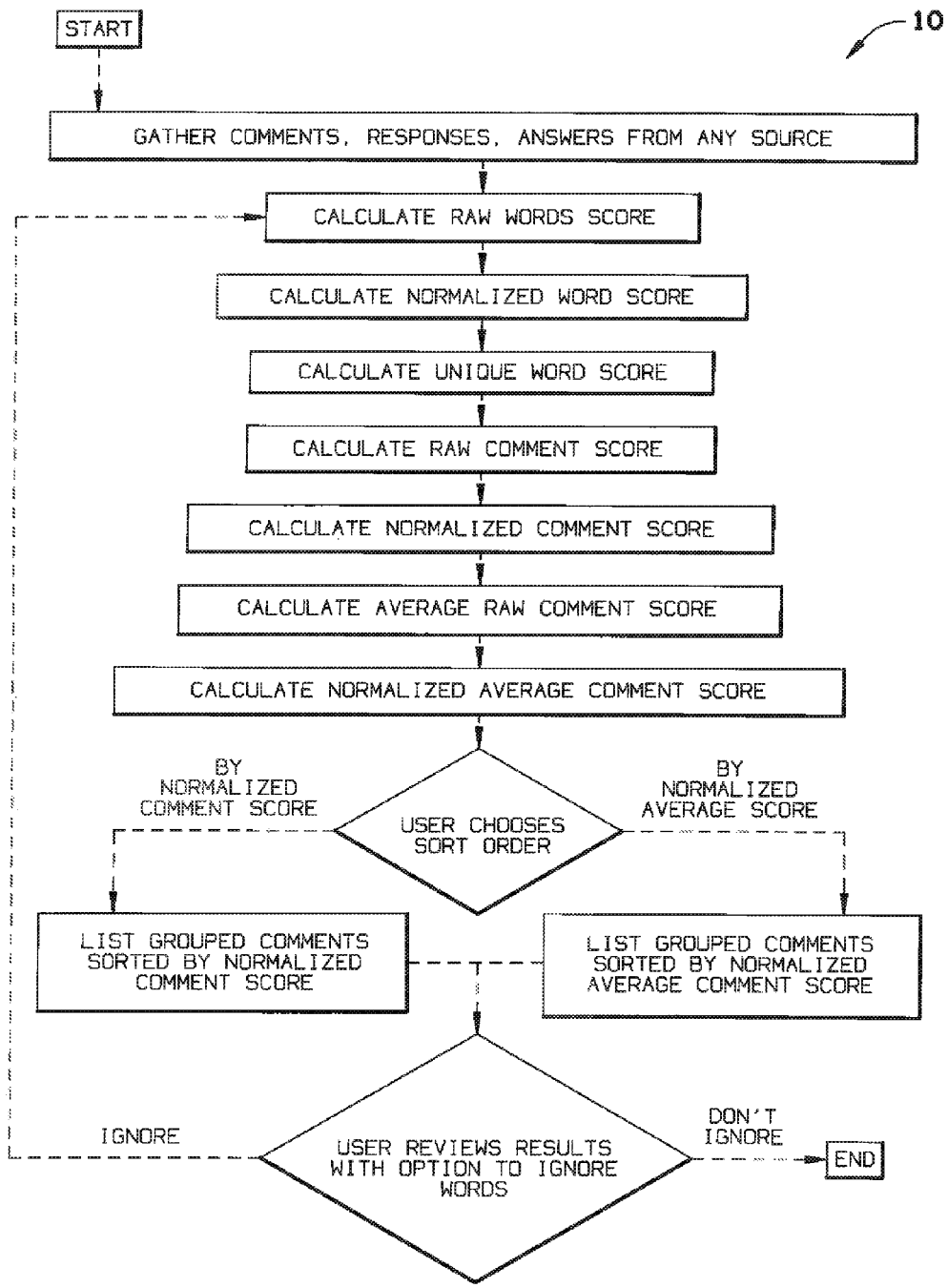

METHOD FOR SORTING A DEFINED SET OF COMMENTS

FIELD OF THE INVENTION

This invention relates to method for sorting a defined set of comments.

BACKGROUND OF THE INVENTION

Business and individuals have been interested in comments for many years. For the past few years, comments from blogs, social media, surveys and other media have become increasingly important. These comments have traditionally been sorted chronologically or read by individuals to determine meaning and determine the most important or useful comments. The present invention provides a method for sorting the comments into a more meaningful order than chronological and less cumbersome than manual reading.

BRIEF SUMMARY OF THE INVENTION

The present invention includes methods, systems and other means of evaluating and ranking comments from any source. The method for sorting a defined set of comments comprises: first, calculating a normalized word score. Then using the normalized word score to calculate a unique word score. After that the method uses the raw comment score to calculate a normalized comment score; and finally the method sorts the defined set of comments by the normalized comment score.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 shows a schematic of the method involved in the present invention

DETAILED DESCRIPTION OF THE INVENTION

Embodiments of the present invention overcome many of the obstacles associated with discerning between impacting and non-impacting comments, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements.

FIG. 1 shows the method of the invention. The method starts with a user posting some media on a website to which readers can comment. After that, the website gathers comments, responses and answers from readers from any source. Beyond merely commenting on the website itself, the website will trackback links to other websites where the media is being discussed. Each comment has a total number of words (Tw) and a total number of raw words (Rw). A raw word is a particular word that can be any noun, verb, adjective, adverb, acronym, abbreviation or other series of contiguous letters. Words such as articles (a, an, the) and prepositions are removed automatically, other words can be removed manually as explained below.

The first criteria measurement in the method is to calculate the raw word score. The raw word score (Rs) is the number of times a particular word appears in all of the comments, responses and answers collectively. In some embodiments, the raw word score (Rs) is the number of times a particular word appears in all of the comments, responses and answers collectively plus an additional amount for the number of times a particular word appears in all of the comments, responses and answers that generate additional activity such as additional comments, reposts, shares or likes.

The second criteria measurement in the method is to calculate the normalized words score (Ns). Of all the words in the first criteria, the base number (Bn) is the largest raw word score. Normalized word score is raw word score divided by base number times one hundred. Therefore, each word has its score normalized by the following formula:

$$Ns\left[\frac{Rs}{Bn} * 100\right] \qquad \text{eqn. 1}$$

The third criteria measurement in the method is to calculate the unique words score (Uswn). In order to ensure that each word has a unique score, the words are sorted by Ns and then alphabetically. The unique word score for words with a unique normalized word score equals the unique normalized word score. Therefore, where there is only one word with an Ns; then $$Ns = Uswn \qquad \text{eqn. 2}$$

as the score is already unique.

Where there is more than one word with an identical Ns, then the Uswn for the nth word alphabetically is $$Uswn = Ns + 0.00001 \times n \qquad \text{eqn. 3}$$

The fourth criteria measurement in the method is to calculate a raw comment score (RCs) for a particular comment, response or answer. The raw comment score is a sum of unique word scores for each word in that comment.

$$RCs = \sum_{s}^{n} Yswn \qquad \text{eqn. 4}$$

The fifth criteria measurement in the method is to calculate a normalized comment score (NCs). Of all the comments in the fourth criteria, the base comment number (BCn) is the raw comment score of the comment which has the greatest raw comment score. The normalized comment score is the normalized comment score is the raw comment score divided by a base comment score times one hundred. Therefore, each comment has its score normalized by the following formula:

$$NCs = \left[\frac{RCs}{BCn} * 100\right] \qquad \text{eqn. 5}$$

The sixth criteria measurement in the method is to calculate an average raw comment score (ARCs). The average raw comment score is equal to the raw comment score divided by the total number of words in the comment (Tw).

$$ARCs = \frac{RCs}{Tw} \qquad \text{eqn. 6}$$

The seventh criteria measurement in the method is to calculate a normalized average raw comment score (NARCs). Of all the comments in the sixth criteria, the base average comment number (BACn) is the raw comment score of the comment which has the greatest raw comment score. The normalized average raw comment score is the normalized average raw comment score is the average raw comment score, divided by the base average comment number, times one hundred. Therefore, each comment has its score normalized by the following formula:

$$NARCs = \left[\frac{ARCs}{BACn} * 100\right] \qquad \text{eqn. 7}$$

At this point the user has a choice as to which of the previous seven measurements the user wants to utilize to sort the comments, answers and responses. It is most effective to use either the normalized comment score or the normalized average comment score.

If the user selects the normalized comment score then a list is produced which has grouped the comments sorted by normalized comment score. Similarly, if the user selects the normalized average raw comment score then a list is produced which has grouped the comments sorted by normalized average comment score.

At this point, the user has a preliminary set of results. A user can elect to remove raw words from the list of raw words that have been preselected in the first criteria measurement. If the user chooses to ignore these words then the method begins again with the selected words ignored. Otherwise the method is complete.

An exemplarily embodiment of the invention is shown below. Pepsi MAX posted this question to their Facebook wall on Dec. 18 2010, "Okay—You've got 30 seconds to tell a friend why they should try Pepsi MAX. WHAT DO YOU SAY??" They received 145 comments in total.

The raw words selected were:

| Word | # times used | # times comment liked | Raw Word Score |
|---|---|---|---|
| Pepsi | 34 | 0 | 34 |
| Taste | 29 | 0 | 29 |
| Great | 18 | 0 | 18 |
| Drink | 22 | 0 | 22 |
| MAX | 22 | 0 | 22 |
| Try | 17 | 0 | 17 |
| Better | 10 | 0 | 10 |
| Sugar | 8 | 2 | 9 |
| Calorie | 10 | 0 | 10 |
| More | 7 | 0 | 7 |

The normalized word scores were:

| Word | Raw Word Score | Calculation | Normalized Word Score |
|---|---|---|---|
| Pepsi | 34 | (34/34) * 100 | 100 |
| Taste | 29 | (29/34) * 100 | 85 |
| Great | 18 | (18/34) * 100 | 53 |
| Drink | 22 | (22/34) * 100 | 65 |
| MAX | 22 | (22/34) * 100 | 65 |
| Try | 17 | (17/34) * 100 | 50 |
| Better | 10 | (10/34) * 100 | 29 |
| Sugar | 9 | (9/34) * 100 | 26 |
| Calorie | 10 | (10/34) * 100 | 29 |
| More | 7 | (7/34) * 100 | 21 |

The unique word scores were:

| Word | Normalized Word Score | Unique Word Score |
|---|---|---|
| Pepsi | 100 | 100 |
| Taste | 85 | 85 |
| Great | 53 | 53 |
| Drink | 65 | 65.000001 |
| MAX | 65 | 65.000002 |
| Try | 50 | 50 |
| Better | 29 | 29.000001 |
| Sugar | 26 | 26 |
| Calorie | 29 | 29.000002 |
| More | 21 | 21 |

The raw comment scores were:

| Comment | Sum Unique Word Scores | Raw Comment Score |
|---|---|---|
| Great taste | 53 + 85 | 138 |
| Tastes great! | 85 + 53 | 138 |
| %&)@ beer. Drink Pepsi! | 0 + 0 + 65 + 100 | 165 |
| because pepsi max is the best and it taste great just do it you will love it | 0 + 100 + 65.000002 + 1 + 0 + 26.000003 + 0 + 0 + 85 + 53 + 0 + 0 + 0 + 0 + 26.000004 + 0 | 354.000009 | etc. for all comments received

The normalized comment scores were:

| Comment | Raw Comment Score | Calculation | Normalized Comment Score |
|---|---|---|---|
| Great taste | 138 | 138/354.000009 | 39 |
| Tastes great! | 138 | 138/354.000009 | 39 |
| %&)@ beer. Drink Pepsi! | 165 | 165 | 47 |
| because pepsi max is the best and it taste great just do it you will love it | 354.000009 | 354.000009 | 100 | etc. for all comments received

The average raw comment scores were:

| Comment | Raw Comment Score | Calculation | Average Raw Comment Score |
|---|---|---|---|
| Great taste | 138 | 138/2 | 69 |
| Tastes great! | 138 | 138/2 | 69 |
| %&)@ beer. Drink Pepsi! | 165 | 165/4 | 41.25 |
| because pepsi max is the best and it taste great just do it you will love it | 354.000009 | 354/17 | 20.82 | etc. for all comments received

The normalized average comment scores were:

| Comment | Average Raw Comment Score | Calculation | Normalized Average Raw Comment Score |
|---|---|---|---|
| Great taste | 69 | (69/69) * 100 | 100 |
| Tastes great! | 69 | (69/69) * 100 | 100 |

-continued

| Comment | Average Raw Comment Score | Calculation | Normalized Average Raw Comment Score |
|---|---|---|---|
| %&)@ beer. Drink Pepsi! | 41.25 | (41.25/69) * 100 | 59.783 |
| because pepsi max is the best and it taste great just do it you will love it | 20.82 | (20.82/69) * 100 | 30.2 | etc. for all comments received

The listed comments were:

| Comment | Count | Normalized Average Raw Comment Score (Sort Order) |
|---|---|---|
| Great taste | 2 | 100 |
| %&)@ beer. Drink Pepsi! | 1 | 59.783 |
| because pepsi max is the best and it taste great just do it ou will love it | 1 | 30.2 | etc. for all comments received and:

| Comment | Calculation | Normalized Comment Score (Sort Order) |
|---|---|---|
| because pepsi max is the best and it taste great just do it you will love it | 1 | 100 |
| %&)@ beer. Drink Pepsi! | 1 | 47 |
| Great taste | 2 | 39 | etc. for all comments received

That which is claimed:

1. A method for sorting a defined set of comments, comprising
   receiving the defined set of comments on a website;
   calculating a normalized word score;
   wherein the normalized word score is a raw word score divided by a base number times one hundred;
   wherein the raw word score is occurrences of a particular word in the defined set of comments; and
   wherein the base number is a largest raw word score in the defined set of comments;
   using the normalized word score to calculate a unique word score;
   using the unique word score to calculate a raw comment score;
   using the raw comment score to calculate a normalized comment score; and
   sorting, via a system, the defined set of comments by the normalized comment score.

2. The method for sorting a defined set of comments of claim 1, further comprising
   using the raw comment score to calculate an average raw comment score;
   using the average raw comment score to calculate a normalized average raw comment score;
   sorting the defined set of comments by the normalized average raw comment score.

3. The method for sorting a defined set of comments of claim 1, further comprising,
   wherein the raw comment score is a sum of unique word scores for each word in that comment;
   wherein the unique word score for words without a unique normalized word score is the normalized word score plus a number such that each raw word has a unique word score.

4. The method for sorting a defined set of comments of claim 1, further comprising,
   calculating a unique word score as follows:
   sorting, via the system each word in the set of comments by the normalized word score then alphabetically;
   wherein a single word set occurs if there is only one word with a selected normalized word score and then the normalized word score equals the unique normalized word score;
   wherein an alphabetized set occurs if there is more than one word with the selected normalized word score and then the unique word score equals the unique normalized word score plus the number of the words in the alphabetized set times 0.00001.

5. The method for sorting a defined set of comments of claim 1, further comprising,
   wherein the normalized comment score is the raw comment score divided by a base comment score times one hundred.

6. The method for sorting a defined set of comments of claim 1, further comprising,
   using the raw comment score to calculate an average raw comment score;
   wherein the average raw comment score is the raw comment score divided by a total number of words in each comment;
   using the average raw comment score to calculate a normalized average raw comment score;
   wherein the normalized average raw comment score is the average raw comment score, divided by a base average comment number, times one hundred
   sorting the defined set of comments by the normalized average raw comment score.

7. A method for sorting a defined set of comments, comprising:
   receiving the defined set of comments on a website;
   calculating a normalized word score;
   using the normalized word score to calculate a unique word score;
   using the unique word score to calculate a raw comment score;
   wherein the raw comment score is a sum of unique word scores for each word in that comment;
   wherein the unique word score for words without a unique normalized word score is the normalized word score plus a number such that each raw word has a unique word score;
   using the raw comment score to calculate a normalized comment score; and
   sorting, via a system, the defined set of comments by the normalized comment score.

8. The method for sorting a defined set of comments of claim 7, further comprising
   using the raw comment score to calculate an average raw comment score;
   using the average raw comment score to calculate a normalized average raw comment score;

sorting the defined set of comments by the normalized average raw comment score.

9. The method for sorting a defined set of comments of claim 7, further comprising, wherein the raw comment score is a sum of unique word scores for each word in that comment;

wherein the unique word score for words without a unique normalized word score is the normalized word score plus a number such that each raw word has a unique word score.

10. The method for sorting a defined set of comments of claim 7, further comprising, calculating a unique word score as follows:

sorting, via the system the defined set of comments by the normalized word score then alphabetically;

wherein a single word set occurs if there is only one word with a selected normalized word score then the normalized word score equals the unique normalized word score;

wherein an alphabetized set occurs if there is more than one word with the selected normalized word score then the unique word score equals the unique normalized word score plus the number of the words in the alphabetized set times 0.00001.

11. The method for sorting a defined set of comments of claim 7, further comprising, wherein the normalized comment score is the raw comment score divided by a base comment score times one hundred.

12. The method for sorting a defined set of comments of claim 7, further comprising, using the raw comment score to calculate an average raw comment score;

wherein the average raw comment score is the raw comment score divided by a total number of words in each comment;

using the average raw comment score to calculate a normalized average raw comment score;

wherein the normalized average raw comment score is the average raw comment score, divided by a base average comment number, times one hundred; and sorting the defined set of comments by the normalized average raw comment score.

13. The method for sorting a defined set of comments of claim 7, further comprising, wherein the normalized word score is a raw word score divided by a base number times one hundred;

wherein the raw word score is occurrences of a particular word in the defined set of comments; and wherein the base number is a largest raw word score in the defined set of comments.

* * * * *